March 26, 1968     C. D. DOLAMORE     3,375,426
BATTERY SYSTEM CONTROL CIRCUIT
Filed Feb. 17, 1965
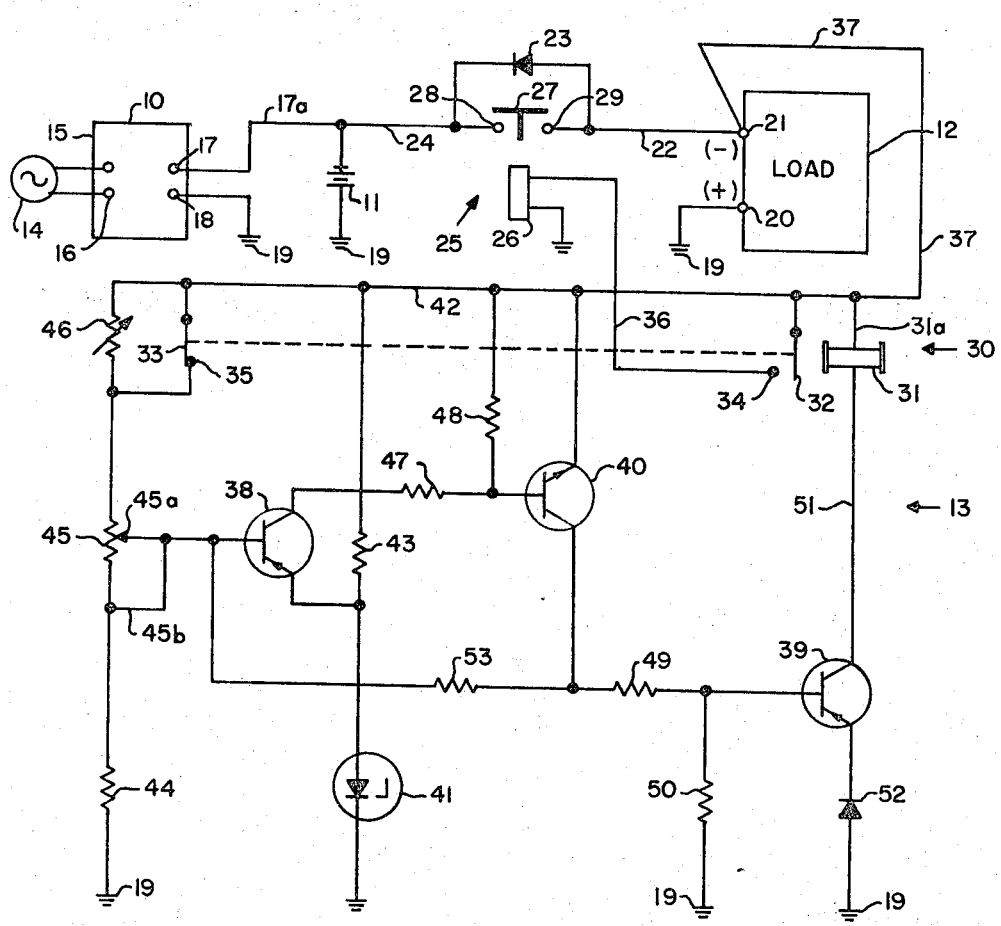
INVENTOR.
CHARLES D. DOLAMORE
BY
ATTY

United States Patent Office 3,375,426
Patented Mar. 26, 1968

3,375,426
BATTERY SYSTEM CONTROL CIRCUIT
Charles D. Dolamore, Lorain, Ohio, assignor to Lorain Products Corporation, a corporation of Ohio
Filed Feb. 17, 1965, Ser. No. 433,425
7 Claims. (Cl. 320—15)

This invention relates to control circuits and is directed more particularly to circuitry for use with a battery system.

In the telephone industry, it is common practice to energize much of the equipment from the output of a battery charger operated from suitable A-C line power. A battery of wet cells may also be connected across the output of the charger and is maintained in a fully charged condition thereby. With such an arrangement, the equipment operates from the battery in the event that the charger fails to supply current whether the failure is due to A-C line power failure or malfunctioning of the charger. As the battery discharges and its voltage falls, some of the equipment operated therefrom may fail to function in the desired manner. For example, a D-C to D-C converter designed to operate from a 46 to 50 volt D-C source may cease operating when the battery voltage falls below 46 volts.

In order to extend the length of time for which the battery operated equipment will function when the battery is being discharged under line failure conditions, a battery with an increased number of cells and greater voltage may be used to energize the equipment through a voltage dropping device. With such an arrangement, when the voltage supplied to the equipment has decreased to a minimum suitable value because of falling battery voltage, the voltage dropping device may be shorted out or bypassed thereby causing full battery voltage to be applied to the equipment.

After the voltage dropping device is bypassed, the equipment will continue to operate in the desired manner until the battery voltage drops below the minimum suitable value. Thus the operating time of the equipment is extended. For example, equipment requiring 46 to 50 volts input may be connected to a 54 volt battery through a device such as a counter E.M.F. cell. Assuming a 4 volt drop across the C.E.M.F. cell, 50 volts is applied to the equipment comprising the load. If, now, the battery begins to discharge, the load voltage will begin dropping from its 50 volt value. When the load voltage has decreased to 46 volts, the battery voltage will be 50 volts. Now, by shorting out the voltage dropping element, the load will be connected directly to the battery and will operate in a suitable manner until the battery voltage has decreased to 46 volts.

It will be understood that, when the battery charger again begins to function, the battery voltage and the load voltage will increase. When the load voltage becomes sufficiently great, the voltage dropping device may be reconnected between the battery and the load.

In the past, the bypassing of the voltage dropping element when the load voltage has dropped to a predetermined minimum value has been accomplished by the use of voltmeter relays. These voltmeter relays include contacts, some of which are attached to the armature of a meter movement. Due to the meter movement, voltmeter relays are relatively expensive. Furthermore, the contacts of such devices when closed are not held tightly together and are thus sensitive to vibration.

Accordingly, it is an object of the invention to provide improved relatively inexpensive means for accomplishing the above function and which is not adversely affected by vibrations.

More recently, transistorized high-low voltage sensing circuits have come into use to replace the voltmeter relays. These circuits generally include a high voltage sensing section and a low voltage sensing section. The high voltage sensing section serves to connect a voltage dropping element between the battery and the load when the load voltage becomes greater than a certain value and the low voltage sensing section operates a bypass element when the load voltage drops below a different value.

It would be advantageous with regard to reducing cost and complexity to be able to utilize a single circuit which could perform both of the above functions by shunting the voltage dropping element connected between the battery and the load when the load voltage drops below a predetermined minimum value. However, circuitry of this character has an instability problem. This is because as soon as the voltage dropping element is bypassed, the load voltage increases and the circuitry will terminate the bypass action and revert to its former state. The load voltage then drops below the predetermined minimum value again and is followed by bypass activity. This repetitive sequence of bypass and non-bypass activity or hunting activity when the load voltage is below the predetermined minimum value is an unstable condition which cannot be permitted.

It is thus an object of the invention to provide improved circuitry which automatically closes or opens a current bypass path around a voltage dropping device connected between a battery and a load in response to the voltage of the load.

It is also an object of the invention to provide circuitry of the above character which is stable in operation.

It is another object of the invention to provide a circuit configuration including signal responsive means, signal compensating operated means controlled by the signal responsive means and primary circuit voltage control means. In the primary circuit voltage control means, current flowing from a current source to a load is made to pass through a voltage modifying element during a first condition but is shunted around this element in a second condition. The signal compensating operated means prevents the above circuitry from reverting to the second condition after the first condition is initiated and vice versa.

It is a further object of the invention to provide circuitry which senses a voltage that is proportional to the load voltage and provides a current bypass path around a voltage dropping element connected between a battery and a load when the load voltage becomes less than a predetermined minimum value and which thereafter reduces the voltage being sensed to prevent reversion of the circuitry to its former state when the load voltage increases after the current bypass path is established.

Still another object of the invention is to provide circuitry in which a first transistor senses a voltage proportional to the load voltage and compares this load proportional voltage to a reference voltage to control the conduction of a relay controlling transistor. During a first condition, the controlled relay is energized and a voltage modifying element such as a C.E.M.F. cell is connected between the battery and the load. In a second condition, the controlled relay is re-energized, and a bypass element will be operated to bypass current around the voltage modifying element. At the same time, a resistor will be inserted between the load and the load voltage proportioning means to reduce the voltage on the latter. In this manner, after the voltage modifying element is bypassed to initiate the second condition, the circuitry is prevented from reverting to its oroginal, first condition until the load voltage becomes greater than said predetermined minimum value.

When the load voltage becomes greater than the predetermined minimum value, the bypassing of the voltage modifying element terminates causing the load voltage to drop and the first condition as again present. Simultaneously with the beginning of the first condition, the resistor is removed from between the load and the load voltage proportioning means to increase the voltage on the latter. This prevents a recurrence of the second condition when the load voltage drops due to load current being directed through the voltage modifying element during the first condition.

Other objects and advantages of the invention will become apparent from the following description and accompanying drawing in which:

The single figure is a schematic drawing of exemplary circuitry embodying the invention.

Referring to the figure, it will be seen that the circuitry embodying the invention may include a battery charger 10, a battery 11, a load 12 and a control circuit 13. The battery charger 10 may be energized from a suitable A-C source 14, such as line power connected to input terminals 15 and 16 provided thereon. The battery charger 10 rectifies the A-C of the line and supplies the rectified current to the battery 11. This battery is maintained in a fully charged condition while power is available from the source 14 by connecting a negative output terminal 17 of the charger to the negative pole of the battery through a lead 17a and by connecting a positive output terminal 18 of the charger through a ground as at 19, the positive pole of the battery 11 also being connected to the ground 19.

Current is supplied from the battery charger 10 to the load 12 by connecting a positive terminal 20 thereof to the ground 19 and by connecting a negative terminal 21 to the negative pole of the battery 11 by means of a lead 22, a C.E.M.F cell 23 and a lead 24. In order to shunt current around the C.E.M.F. cell 23 when the load voltage becomes less than a predetermined minimum value, a bypass contactor 25 is provided. This contactor includes a winding 26, a movable contact 27 and fixed contacts 28 and 29 connected to the leads 24 and 22, respectively. The charger 10, the battery 11, the load 12, the C.E.M.F. cell 23 and the contactor 25 form a primary circuit voltage control means.

The operation of the contactor 25, as will be seen presently, is controlled by a signal compensating operated means which may include a suitable electromagnetic switch means such as relay 30 having a winding 31, contact arms 32 and 33 fixed contacts 34 and 35. The relay 30 may be termed a bypass controlling means. A current path for the winding 26 of the contactor 25 is established by connecting one end of the winding to ground 19, by connecting the other end to the fixed contact 34 of the relay 30 via a lead 36 and by connecting the contact arm 32 of the relay 30 to the negative terminal 21 of the load through a lead 37.

It is desirable that the contacts 32 and 34 of the relay be open when the voltage of the load 12 is above a predetermined minimum value in order that no current will be supplied to the winding 26 of the contactor 25. To this end a signal responsive means which includes P–N–P type transistors 38 and 39 and an N–P–N type transistor 40 is provided. It will be understood that these transistors may be replaced by transistors of the opposite type if the polarities in the circuit are reversed. The transistor 38 senses the voltage of the load 12 and compares it to a suitable constant voltage reference and also renders the transistors 40 and 39 conducting when the load voltage is above a predetermined minimum value. The transistor 40 is an amplifying transistor which serves as a coupling means between the transistors 38 and 39.

The constant reference voltage for the transistor 38 is provided herein by a zener diode 41 connected to ground 19 and also to a lead 42 through a resistor 43 which establishes the operating point of the zener diode. Since the lead 42 is connected to the terminal 21 of the load through the lead 37 and since the other terminal 20 of the load is grounded, any component or components connected between the lead 42 and ground 19 are in effect connected across the load.

To the end that a voltage proportional to that of the load 12 will be developed, a resistor 44, with variable resistors 45 and 46 are serially connected between ground 19 and the lead 42. In order to connect the upper end of the variable resistor 45 to the lead 42 and thus to the terminal 21 of the load 12, the contact arm 33 and the fixed contact 35 of the relay 30 are bridged across the resistor 46. The resistors 44 and 45 form a voltage divider which functions as a load voltage proportioning means in the signal responsive means. The resistor 46 serves as a signal compensating means for appropriately increasing or decreasing the voltage on the load voltage proportioning means and is included in the signal compensating operated means.

In order that the transistor 38 may compare a portion of the load voltage to the constant voltage reference, the base electrode of that transistor is connected to a wiper arm 45a of the potentiometer 45 and the emitter electrode is connected to a point between the zener diode 41 and the resistor 43. The wiper arm 45a is connected, as shown, to the lower end of the variable resistor 45 and can be adjusted to select the desired predetermined load voltage. The connections of the transistor 38 are completed by suitable load resistors 47 and 48, serially connected between the collector electrode of the transistor and the lead 42.

To the end that the signal developed across the load resistor 48 by the conduction of transistor 38 will be amplified to control the conduction of the relay controlling transistor 39, the transistor 40 is provided. A path for current flow through the transistor 40 is established by connecting the emitter electrode thereof to the lead 42 and by connecting the collector electrode to ground 19 through resistors 49 and 50. Bias voltage for the transistor 40 is provided by connecting the base electrode thereof to a point between the load resistors 47 and 48.

In order to close the contacts 33 and 35 and open the contacts 32 and 34 of the relay 30, this taking place when the transistors 38 and 40 conduct, one end of the winding 31 is connected to the lead 37 through a lead 31a while the other end of the winding is connected to the collector electrode of the relay controlling transistor 39 by means of a lead 51. The current path through the transistor 39 is completed by connecting the emitter electrode thereof to ground 19 through a diode 52, this diode serving to prevent the transistor 39 from conducting unless forward bias voltage is applied thereto.

For the purpose of forward biasing the transistor 39 when the transistors 38 and 40 conduct, the base electrode of transistor 39 is connected to a point between the resistors 49 and 50. Any voltage produced across the resistor 50 is applied between the emitter and base electrodes of the transistor 39, thus serving as forward bias.

The control circuit 13 is completed by a feedback resistor 53 connected between the collector electrode of transistor 40 and the base electrode of the transistor 38. The resistor 53 provides positive feedback which accelerates the turn-on or turn-off of the transistor 38.

Operation of the foregoing circuitry will now be described. When the lead 24 is first connected to the negative pole of the battery 11, the bypass contactor 25 will be energized since the contacts 32 and 34 of the relay 30 are closed and current is therefore being supplied to the winding 26. Accordingly, current will now flow from the positive pole of the battery to ground 19 and from ground 19 through the load 12, the lead 22, the contacts 27, 28 and 29 of the contactor and the lead 24 to the negative side of the battery. Assuming that the voltage of the battery is an exemplary value of 54 volts, the potential appearing between the terminals 20 and 21 of the load 12 will be 54 volts. The load voltage will also be present between the lead 42 and the ground 19 since this lead is connected to the negative terminal 21 of the load through the lead 37. Due to the potential on the lead 42, current will flow from the ground 19 through the resistor 44, the variable resistor 45 and the resistor 46 to the lead 42. Current will also flow from ground 19 through the zener diode 41 and the resistor 43 to lead 42. These two currents will then flow through the lead 42 and These two current will then flow through the lead 42 and the lead 37 to the negative terminal 21 of the load.

When the voltage appearing between the wiper arm 45a of the variable resistor 45 and ground becomes greater than the voltage of the zener diode 41, the transistor 38 begins to conduct. The conduction of the transistor 38 causes current to flow from ground 19 through the zener diode 41, the emitter-collector path of the transistor 38, the resistor 47 and the resistor 48 to the lead 42 and then to the negative terminal 21 of the load.

The voltage developed across the resistor 48 by the emitter-collector current flow of the transistor 38 forward biases the transistor 40 and renders it conducting. Current then flows from the ground 19 through the resistor 50, the resistor 49 and the collector-emitter current path of the transistor 40 to the lead 42. The conduction of the transistor 40 causes its collector electrode to become more negative with respect to ground. This negative potential is applied to the base electrode of the transistor 38 through the feedback resistor 53 and causes the conduction of the transistor to increase more rapidly than it would otherwise.

The voltage developed across the resistor 50 by the conduction of the transistor 40 forward biases the transistor 49 and renders it conducting. Consequently, current flows from the ground 19 through the diode 52, the emitter-collector path of the transistor 39, the lead 51, the winding 31 of the relay 30 and the lead 37 to the negative terminal 21 of the load. The current supplied to the winding 31 by the transistor 39 causes the contact arm 32 to pull away from the fixed contact 34 and causes the contact arm 33 to be pulled against the fixed contact 35.

With the contact arm 32 pulled away from the fixed contact 34, the current path of the winding 26 is open and the movable contact 27 is released thus opening the electrical connection between the fixed contacts 28 and 29. Consequently, current flowing between the load 12 and the charger 10 must now pass through the C.E.M.F. cell 23 and, as a result, the voltage of the load will be lower than the voltage of the battery. For example, assuming that the potential of the battery is 54 volts and that the voltage drop across the C.E.M.F. cell is 4 volts, the voltage appearing between the terminals 20 and 21 of the load 12 will be 50 volts.

It will be seen that since the contact arm 33 is now pulled against the fixed contact 35, the upper end of the variable resistor 45 is now connected directly to the negative terminal 21 of the load 12 through the contacts 33, 35 and the leads 42 and 37. Accordingly, the resistor 46 is no longer in the circuit and the resistors 44 and 45 are in effect now connected across the load 12 and may be considered as a load voltage proportioning means. The circuitry is now operating in a normal manner or first condition as when alternating current is being supplied to the charger 10 and the charger is maintaining the battery in a fully charged condition.

When the C.E.M.F. cell is inserted into the load current path, as described above, the load voltage decreases. To prevent this decrease in load voltage from turning off the transistors 38, 39 and 40 of the signal responsive means, the resistor 46 is removed from the connection between the load terminal 21 and the resistor 45. The removal of the resistor 46 from the circuit causes the voltage on the load voltage proportioning means to increase by a sufficient amount to compensate for the reduced load voltage. As a result, the circuitry is prevented from reverting to a second condition until the load voltage becomes less than a prdeetermined minimum value thereby eliminating an unstable hunting action between the first and second conditions described above.

Assuming now that the A-C source 14 fails, no current will be supplied to the battery 11 and the load 12 from the charger 10. Consequently, the battery voltage will decrease as the load 12 now draws all its current from the battery. When the battery voltage has decreased to, for example, 50 volts, the voltage between the terminal 20 and 21 will be 46 volts due to the presence of the C.E.M.F. cell. If the wiper arm 45a of the variable resistor 45 is adjusted so that the transistor 38 will not conduct when the load voltage is less than 46 volts, it will be seen that the transistor 38 will turn off as the load voltage becomes less than the predetermined minimum value of 46 volts.

When the transistor 38 ceases conducting, the transistors 40 and 39 likewise turn off. As a result, no current is supplied to the winding 31 from the transistor 39 and the contact arms 32 and 33 are released. The contact arm 32 becomes positioned against the fixed contact 34 and the contact arm 33 separates from the fixed contact 35.

With the contacts 32 and 34 closed, current will flow from ground 19 through the winding 26 of the contactor 25, the lead 36, the fixed contact 34, the contact arm 32 and the lead 37 to the negative terminal of the load 12. This current flow through the winding of the contactor pulls the movable contact 27 against the fixed contacts 28 and 29. Current can now flow from the negative terminal of the load through the lead 22, the fixed contact 29, the movable contact 27, the fixed contact 28 and the lead 24 to the negative pole of the battery 11. Thus, the C.E.M.F. cell 23 is now bypassed and the 50 volt potential of the battery is applied between the terminals 20 and 21 of the load 12.

The movement of the contact arm 33 away from the fixed contact 35 when the relay 30 de-energizes serves to open the direct connection of the variable resistor 45 to the lead 42. As a result, the resitsor 46 is effectively connected between the variable resistor 45 and the negative terminal 21. This insertion of the resistor 46 between the resistor 45 and the load when the relay 30 releases the contact arms 32 and 33 upon the load voltage becoming less than the predetermined minimum value reduces the voltage across the load voltage proportioning means which includes the resistors 44 and 45 and also between the wiper arm 45a and ground. This reduction in voltage compensates for the increased voltages which would be impressed on the load voltage proportioning resistors 44 and 45 due to the increased load voltage when the C.E.M.F. cell is bypassed upon initiation of the second condition. Thus the connection of the resistor 46 between the resistor 45 and the terminal 21 of the load prevents the transis'or 38 from being rendered conducting until the load voltage becomes substantially greater than the predetermined minimum value to prohibit the unstable condition, in which the circuitry would undesirably revert to the first condition after the second condition is attained or vice versa.

After the A-C source 14 is restored to operation, the charger will supply current to the battery 11 and the load 12. Accordingly, the battery voltage will rise. Because the contactor 25 is energized at this time, the load is connected directly across the battery. Therefore, load voltage is equal to battery voltage and will increase with the battery voltage. As the load voltage increases, a point will be reached at which the transistor 38 will become forward biased causing the relay 30 to become energized and the C.E.M.F. cell to be connected in the current path between the battery and the load, as explained previously.

The point at which load voltage causes the transistor 38 to conduct is substantially greater than the predetermined minimum load voltage and is determined by the adjustment of the variable resistor 46. This resistor is adjusted so that the transistor 38 will not turn on until the voltage of the load 12 is sufficiently great so that insertion of the C.E.M.F. cell into the current path between the charger and the load will not cause the load voltage to drop below the predetermined minimum value. If this were not prevented, an unstable operating condition would result. Thus the resistor 46 precludes unstable operation when the transistor 38 turns on to provide a first condition of operation. As explained previously, the resistor 46 also prevents unstable operation when the circuit enters a first condition of operation.

From the foregoing it will be seen that there is provided circuitry for automatically bypassing a C.E.M.F. cell connected between a battery and a load when the load voltage becomes less than a predetermined minimum value. The circuitry also continues this C.E.M.F. cell bypass operation until the load voltage again increases to a value substantially greater than the predetermined minimum value as the battery charges after the alternating current source 14 again begins to function. Thus the C.E.M.F. cell is automatically inserted into or removed from the current path between the charger and the load as required while unstable operation which would otherwise occur is prevented.

It will be understood that the embodiment shown herein is for explanatory purposes and may be changed or modified without departing from the spirit and scope of the invention and set forth in the claims appended hereto.

What I claim is:

1. In a battery system having a load and a battery charger connected across the battery, in combination, a counter cell connected between the battery and the load, a bypass contactor having fixed contacts connected to opposite ends of said counter cell, a movable contact and a winding, a relay having first and second fixed contacts and first and second contact arms and a winding, a voltage divider and a first resistor connected across the load terminals, a second resistor and a zener diode connected across the load terminals, third and fourth resistors, a first transistor having a base electrode connected to said voltage divider, an emitter electrode connected to a point between said second resistor and said zener diode, and a collector electrode connected to one side of the load through said third and fourth resistors, coupling means, a second transistor having a collector electrode connected to said one side of the load through said winding of said relay, an emitter electrode connected to the other side of the load and a base electrode connected to said fourth resistor through said coupling means, means for connecting one end of said bypass contactor winding to said other side of the load, means for connecting said other end of said bypass contactor winding to said first fixed contact of said relay, means for connecting said first contact arm of said relay to said one side of said load, a feedback resistor connected between the base electrode of said first transistor and the base electrode of said second transistor, means for connecting said second fixed contact of the relay to a point between said voltage divider and said first resistor, means for connecting said second contact arm of the relay to said one side of the load whereby said first resistor is inserted in the current path between said voltage divider and said one side of said load when the relay is de-energized.

2. In a battery system having a load and a battery charger connected across a battery, in combination, unidirectional conducting means connected between the battery and the load, electromagnetic switch means having a first set of normally closed contacts, a second set of normally open contacts and a winding, bypass means for shunting current around said unidirectional conducting means when said first set of contacts are closed, means for connecting said first set of contacts between said bypass means and one side of said load, voltage dropping means, a voltage divider, means for serially connecting said voltage divider and said voltage dropping means across the load, a constant voltage source, resistive means, first variable conducting means having a control electrode connected to said voltage divider, a first power electrode connected to one side of said constant voltage source, and a second power electrode connected to said one side of said load through said resistive means, means for connecting the other side of said constant voltage source to the other side of said load, second variable conducting means having a control electrode and first and second power electrodes, amplifying means, means for connecting said amplifying means between said control electrode of said second variable conducting means and said resistive means, means for serially connecting said winding of said electromagnetic switch means and said first and second power electrodes of said second variable conducting means across the load whereby said electromagnetic switch means is energized when said second variable conducting means conducts, means for bridging said second set of contacts of said electromagnetic switch means across said voltage dropping means to remove same from the circuit when said electromagnetic switch means is energized.

3. In a system for controlling the voltage supplied to a load from a battery charger across which there is connected a battery, in combination, unidirectional conducting means connected between the battery and the load, a bypass contactor having contacts bridged across said unidirectional conducting means to bypass current around said unidirectional conducting means when said bypass contactor is energized, bypass controlling means, means for connecting said last named means in energizing and de-energizing relationship to said contactor, load voltage proportioning means, constant voltage means, voltage dropping means, means for serially connecting said voltage dropping means and said load voltage proportioning means across said load, first variable conducting means, means for serially connecting said first variable conducting means and said constant voltage means across the load, first variable conducting means being responsive to the difference in voltage between said load voltage proportioning means and said constant voltage means, second variable conducting means connected in signal receiving relationship to said first variable conducting means, means for connecting said second variable conducting means to said bypass controlling means to control the operation thereof, switch means connected across said voltage dropping means, said switch means being operatively responsive to said bypass controlling means whereby said switch means closes when said second variable conducting means conducts and opens when said variable conducting means turns off.

4. In an electrical system having a load connected to a source of electrical energy, in combination, primary circuit voltage control means connected intermediate the source and the load, signal compensating operated means connected in controlling relationship to said primary circuit voltage control means, signal responsive means including a voltage divider connected across the load, first, second and third transistors each having a base, an emitter and a collector electrode, a zener diode and a resistor serially connected across the load, first resistive means connected between the collector electrode of said transistor and one side of the load, means for connecting the emitter electrode of said first transistor to a point between said zener diode and said resistor, means for connecting the base electrode of said first transistor to said voltage divider, means for connecting the control electrode of said second transistor to said first resistive means, means for connecting the emitter electrode of said second transistor to said one side of the load, second resistive means connected between the collector electrode of said second transistor and the other side of the load, means for connecting the base electrode of said third transistor to said second resistive means, means for connecting the emitter electrode of said third transistor to said other side of the load, means for connecting the collector electrode of said third transistor to said signal compensating operated means to control the same in accordance with the voltage present on the load.

5. In an electrical system having a load and a source of electrical energy, in combination, primary circuit voltage control means connected intermediate the source and the load, signal responsive means including a load voltage proportioning voltage divider, first, second and third transistors each having an emitter, a base and a collector electrode, a zener diode, a resistor, means for serially connecting said zener diode and said resistor across the load, first resistive means connected between the collector electrode of said first transistor and one side of said load, means for connecting the base electrode of said first transistor to said voltage divider, means for connecting the emitter electrode of said first transistor to a point between said zener diode and said resistor, second resistive means connected between the collector electrode of said second transistor and the other side of the load, means for connecting the emitter electrode of said second transistor to said one side of the load, means for connecting the base electrode of said second transistor to said first resistive means, means for connecting the base electrode of said third transistor to said second resistive means, means for connecting the emitter electrode of said third transistor to said other side of said load, signal compensating operated means including a relay having a winding and first and second sets of contacts, means for connecting said first set of relay contacts to said third primary circuit voltage control means in controlling relationship, means for serially connecting said second compensating means and said voltage divider across the load, means for connecting said second set of relay contacts across said signal compensating means to control the same in accordance with the voltage on the load.

6. In an electrical system having a load and a source of electrical energy, in combination, a voltage modifying element connected between the source and the load, a contactor having a winding and a set of contacts, means for connecting said set of contacts across said voltage modifying element, signal responsive means including a load voltage proportioning voltage divider, first, second and third transistors each having an emitter, a base and a collector electrode, a zener diode, a resistor, means for serially connecting said zener diode and said resistor across the load, first resistive means connected between the collector electrode of said first transistor and one side of the load, means for connecting the base electrode of said first transistor to said voltage divider, means for connecting the emitter electrode of said first transistor to a point between said zener diode and said resistor, second resistive means connected between the collector electrode of said second transistor and the other side of the load, means for connecting the base electrode of said second transistor to said first resistive means, means for connecting the emitter electrode of said second transistor to said one side of the load, means for connecting the base electrode of said third transistor to said second resistive means, signal compensating operated means, means for connecting said voltage divider between said other side of said load and said signal compensating operated means, means for connecting said signal compensating operated means in energizing relationship to said contactor winding, means for connecting the collector electrode of said third transistor in controlling relationship to said signal compensating operated means whereby the same is controlled in accordance with the voltage of the load.

7. In a system for controlling the voltage supplied to a load from a battery charger across which there is connected a battery, in combination, unidirectional conducting means connected between the battery and the load, bypass off-on conducting means bridged across said unidirectional conducting means to bypass current around said unidirectional conducting means when said bypass means is on, bypass controlling means, means for connecting said last-named means in energizing and deenergizing relationship to said off-on bypass conducting means, load voltage proportioning means, constant voltage means, voltage dropping means, means for serially connecting said voltage dropping means and said load voltage proportioning means across said load, first variable conducting means, means for serially connecting said first variable conducting means and said constant voltage means, across the load, said first variable conducting means being responsive to the difference in voltage between said load voltage proportioning means and said constant voltage means, second variable conducting means connected in signal receiving relationship to said first variable conducting means, means for connecting said second variable conducting means to said bypass controlling means to control the operation thereof, switch means connected across said voltage dropping means, said switch means being operatively responsive to said bypass controlling means whereby said switch means closes when said second variable conducting means conducts and opens when said variable conducting means turns off.

References Cited
UNITED STATES PATENTS

| | | | |
|---|---|---|---|
| 1,439,036 | 12/1922 | Suekoff | 320—13 |
| 3,160,805 | 12/1964 | Lawson | 320—39 |
| 3,247,442 | 4/1966 | Medlar | 320—39 |
| 2,816,262 | 12/1957 | Elliott | 323—15 |

JOHN F. COUCH, *Primary Examiner.*

S. M. WEINBERG, *Assistant Examiner.*